US012695313B2

(12) United States Patent
Chen et al.

(10) Patent No.: US 12,695,313 B2
(45) Date of Patent: Jul. 28, 2026

(54) CHARGING CIRCUITRY, CHARGING METHOD AND POWER SYSTEM FOR SUPERCAPACITOR

(71) Applicant: DELTA ELECTRONICS, INC., Taoyuan City (TW)

(72) Inventors: Si-Wei Chen, Taoyuan City (TW); Wen-Hao Kuo, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 752 days.

(21) Appl. No.: 18/180,836

(22) Filed: Mar. 8, 2023

(65) Prior Publication Data

US 2024/0154452 A1 May 9, 2024

(30) Foreign Application Priority Data

Nov. 8, 2022 (CN) ......................... 202211390617.X

(51) Int. Cl.
*H02J 7/00* (2026.01)
*H02J 7/06* (2006.01)
(Continued)

(52) U.S. Cl.
CPC ............... *H02J 7/345* (2013.01); *H02J 7/06* (2013.01); *H02J 7/80* (2026.01); *H02J 7/933* (2026.01);
(Continued)

(58) Field of Classification Search
CPC ...... H02J 7/345; H02J 7/0047; H02J 7/00712; H02J 7/06; H02J 7/007182; H02J 7/0068;
(Continued)

(56) References Cited

U.S. PATENT DOCUMENTS

2007/0194759 A1* 8/2007 Shimizu ................. H02J 7/345
320/166
2009/0009145 A1 1/2009 Odajima et al.
(Continued)

FOREIGN PATENT DOCUMENTS

CN 103036285 A 4/2013
CN 102437596 B 12/2014
(Continued)

OTHER PUBLICATIONS

Stana G et al., "Supercapacitor Constant-Current and Constant-Power Charging and Discharging Comparison under Equal Boundary Conditions for DC Microgrid Application", Energies, May 1, 2023, vol. 16, No. 10, 27 pages.
(Continued)

*Primary Examiner* — Zixuan Zhou
(74) *Attorney, Agent, or Firm* — CKC & Partners Co., LLC

(57) ABSTRACT

A charging circuitry includes a power electronic converter, a current sensor, a voltage boost/buck controller and a charging mode controller. The power electronic converter is configured to charge or discharge a supercapacitor according to a control command. The current sensor is coupled to the supercapacitor for detecting a first sensed voltage and a second sensed voltage. The voltage boost/buck controller is configured to generate the control command and a current command according to the first and second sensed voltages and an overall feedback. The charging mode controller is configured to generate a current feedback and a voltage feedback to the voltage boost/buck controller according to a driving voltage, the current command and a third sensed voltage of the supercapacitor. The third sensed voltage, the current feedback and the voltage feedback are superposed as
(Continued)

the overall feedback and then inputted to the same input terminal of the voltage boost/buck converter.

16 Claims, 5 Drawing Sheets

(51) Int. Cl.

| | |
|---|---|
| *H02J 7/34* | (2006.01) |
| *H02J 7/80* | (2026.01) |
| *H02J 7/90* | (2026.01) |
| *H02M 3/158* | (2006.01) |

(52) U.S. Cl.
CPC ....... *H02M 3/1582* (2013.01); *H02J 2207/20* (2020.01); *H02J 2207/50* (2020.01)

(58) Field of Classification Search
CPC . H02J 2207/20; H02J 2207/50; H02M 3/1582
USPC ................................................. 320/166–167
See application file for complete search history.

(56) References Cited

U.S. PATENT DOCUMENTS

| | | | | | |
|---|---|---|---|---|---|
| 2009/0237052 | A1* | 9/2009 | Takasu | .................... | H02M 7/48 |
| | | | | | 323/282 |
| 2011/0080143 | A1* | 4/2011 | Parakulam | .......... | H02M 3/1584 |
| | | | | | 323/318 |
| 2013/0154579 | A1 | 6/2013 | Morita et al. | | |
| 2013/0342181 | A1* | 12/2013 | Suppanz | ............. | H02M 3/1584 |
| | | | | | 323/271 |
| 2018/0123383 | A1 | 5/2018 | Tian et al. | | |
| 2019/0356227 | A1* | 11/2019 | Davison | ............... | H02M 3/158 |
| 2022/0158476 | A1 | 5/2022 | Zhang et al. | | |

FOREIGN PATENT DOCUMENTS

| | | | |
|---|---|---|---|
| CN | 103036285 | B | 12/2015 |
| CN | 105406542 | B | 9/2018 |
| CN | 106026334 | B | 1/2019 |
| CN | 113708451 | A | 11/2021 |
| TW | 564587 | B | 12/2003 |
| TW | I472120 | B | 2/2015 |
| TW | 201534023 | A | 9/2015 |
| TW | I773522 | B | 8/2022 |

OTHER PUBLICATIONS

Kalbitz Rene et al., "ANP077: Supercapacitor—A Guide for the Design-In Process—element14 Community", Dec. 13, 2021, Retrieved from the Internet: URL:https://community.element14.com/products/manufacturers/wuerth-elektronik/b/blog/posts/anp077-supercapacitor-a-guide-for-the-design-in-process, retrieved on Oct. 18, 2023.

* cited by examiner

CHARGING CIRCUITRY, CHARGING METHOD AND POWER SYSTEM FOR SUPERCAPACITOR

RELATED APPLICATIONS

This application claims priority to China Application Serial Number 202211390617.X, filed on Nov. 8, 2022, which is herein incorporated by reference.

BACKGROUND

Field of the Invention

The present disclosure relates to a charging circuitry, and more particularly to a charging circuitry, a charging method and a power system for a supercapacitor.

Description of Related Art

At present, the charging methods related to a supercapacitor mainly include constant current charging, constant voltage charging, constant current to constant voltage charging, pulse current charging and constant power charging, etc. The constant current charging is highly efficient, but at the later of charging the energy storage capacity of the supercapacitor is affected because the voltage difference between the two ends thereof is too large; the efficiency of constant voltage charging is too low, and the charging time thereof is slow; the control circuit for the constant power charging is more complicated. In addition, the conventional constant voltage charging mode is based on a digital-to-analog conversion (DAC) control chip that outputs a dynamic voltage command for a voltage boost/buck controllers to follow, nevertheless additional circuit costs are required this function. On the other hand, the lifespan of a battery will be seriously affected because of completely discharge, and therefore a general battery will not be charged from a zero voltage. However, a supercapacitor has no such limitation, and of which the charging cycle begins from a zero voltage to a predetermined voltage.

SUMMARY

One aspect of the present disclosure relates to a charging circuitry for charging or discharging a supercapacitor. The charging circuitry includes a power electronic converter, a current sensor, a voltage boost/buck controller and a charging mode controller. The power electronic converter is configured to charge or discharge the supercapacitor according to a control command. The current sensor is coupled to the supercapacitor for detecting a first sensed voltage and a second sensed voltage. The voltage boost/buck controller is coupled to the supercapacitor, the power electronic converter and the current sensor for generating the control command and a current command according to the first sensed voltage, the second sensed voltage and an overall feedback. The charging mode controller is coupled to the supercapacitor and the voltage boost/buck controller for generating a current feedback and a voltage feedback to the voltage boost/buck controller according to a driving voltage, the current command and a third sensed voltage of the supercapacitor. The third sensed voltage, the current feedback and the voltage feedback are superposed as the overall feedback and then inputted to the same input terminal of the voltage boost/buck converter.

Another aspect of the present disclosure relates to a power system including the aforementioned charging circuitry, a supercapacitor and a power supply. The power supply is coupled to the charging circuitry, and is configured to provide charging power and a driving voltage to the charging circuitry during charging, such that the charging circuitry charges the supercapacitor according to the charging power and the driving voltage; and storing the power from the supercapacitor during discharging.

Yet another aspect of the present disclosure relates a charging method for the aforementioned charging circuitry, which includes: generating a current command according to a first sensed voltage, a second sensed voltage and an overall feedback; providing a driving voltage, the current command and a third sensed voltage to a charging mode controller; converting the driving voltage into a first predetermined voltage and a second predetermined voltage, and converting the third sensed voltage into a fourth sensed voltage; entering a first constant power charging mode for a supercapacitor when the fourth sensed voltage is less than the second predetermined voltage; entering a second constant power charging mode for the supercapacitor when the fourth sensed voltage is greater than or equal to the second predetermined voltage; and entering a constant voltage charging mode for the supercapacitor when the current command is less than the first predetermined voltage. The third sensed voltage, the current feedback and the voltage feedback are superposed as the overall feedback and then inputted to the same input terminal of a voltage boost/buck controller.

BRIEF DESCRIPTION OF THE DRAWINGS

The foregoing aspects and many of the accompanying advantages of this disclosure will become more readily appreciated as the same becomes better understood by reference to the following detailed description, when taken in conjunction with the accompanying drawings.

DETAILED DESCRIPTION

The detailed explanation of the disclosure is described as following. The described preferred embodiments are presented for purposes of illustrations and description, and they are not intended to limit the scope of the disclosure.

Figure 1:
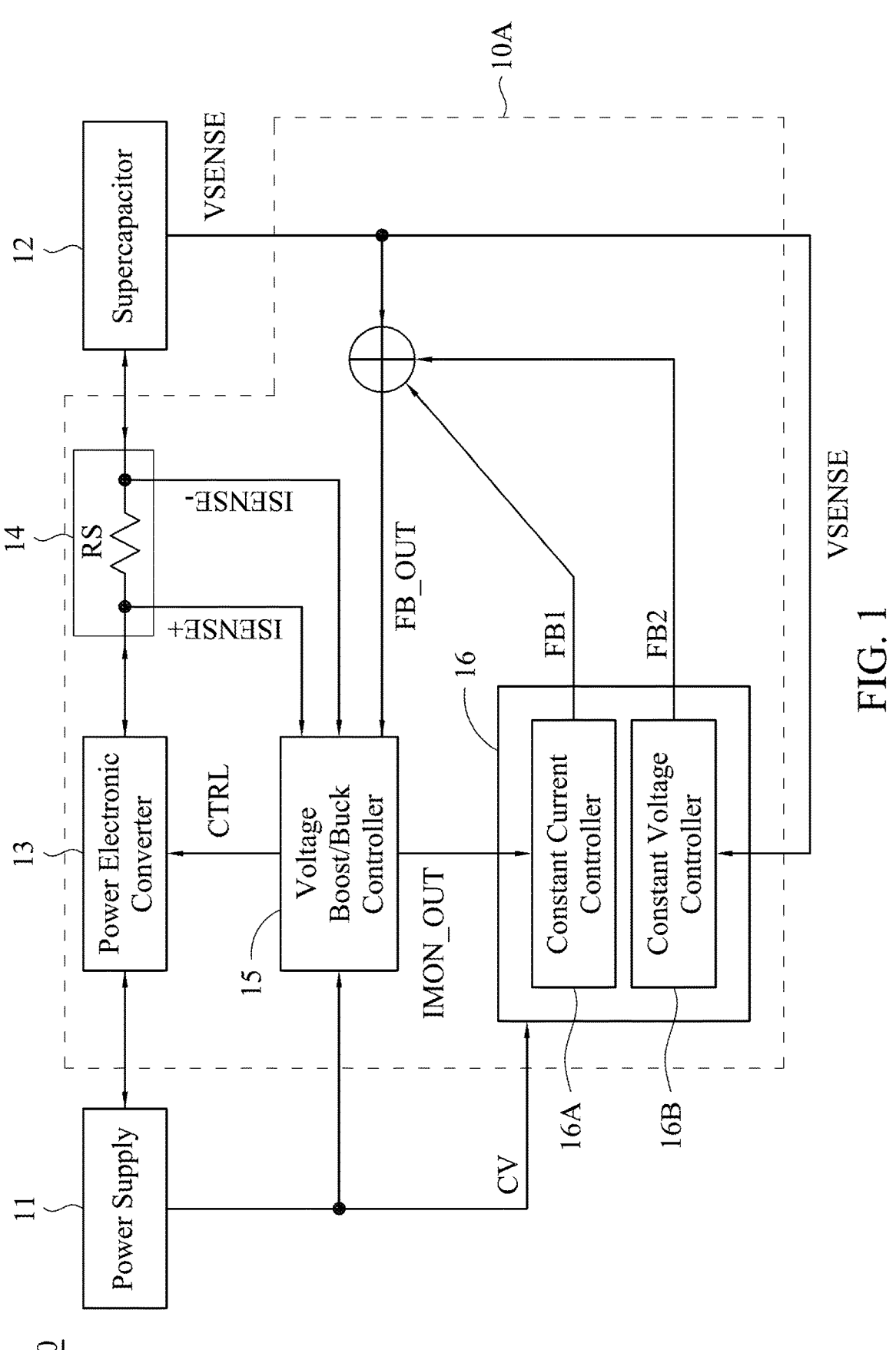
FIG. 1 is a block diagram of a power system in accordance with some embodiments of the present disclosure.

FIG. 1 is a block diagram of a power system 10 in accordance with some embodiments of the present disclosure. As shown in FIG. 1, the power system 10 includes a power supply 11, a supercapacitor 12 and a charging circuitry 10A. The charging circuitry 10A is configured to charge the supercapacitor 12, and includes a power electronic converter 13, a current sensor 14, a voltage boost/buck converter 15 and a charging mode controller 16. The charging mode controller 16 includes a constant current controller 16A and a constant voltage controller 16B.

The power supply 11 is configured to provide charging power and a driving voltage CV and also store power from the supercapacitor 12. The power supply 11 may be a direct-current (DC) power supply. The supercapacitor 12 may be an electrical double-layer capacitor (EDLC) or another suitable high-capacity electrochemical capacitor.

The power electronic converter 13 is coupled to the power supply 11, the current sensor 14 and the voltage boost/buck converter 15, and is configured to convert input power into output power according to a control command CTRL of the voltage boost/buck converter 15. During charging of the supercapacitor 12, the power electronic converter 13 converts the input power provided by the power supply 11 into output power for the supercapacitor 12; during discharging of the supercapacitor 12, the power electronic converter 13 converts the input power provided by the supercapacitor 12 into output power for the power supply 11. The power electronic converter 13 may be a bi-directional DC-to-DC converter, a bi-directional buck-boost converter, or another suitable bidirectional power electronic converter.

The current sensor 14 is coupled to the supercapacitor 12, the power electronic converter 13 and the voltage boost/buck converter 15, and is configured to detect a first sensed current ISENSE+ and a second sensed current ISENSE−. The current sensor 14 may be equivalent to a resistor RS, in which a first end of the resistor RS is coupled to the power electronic converter 13 for detecting the first sensed current ISENSE+, and a second end of the resistor RS is coupled to the supercapacitor 12 for detecting the second sensed current ISENSE−. It is noted that the current sensor 14 is arranged after a energy storage component (e.g. an inductor not illustrated in FIG. 1) or an output terminal of the power electronic converter 13, which can avoid detecting the noise from the input terminal of the power supply 11. The current sensor 14 may be a direct current resistor (DRC), a shunt resistor, a surface mount device (SMD) chip resistor, or another suitable current sensing component or circuit.

The voltage boost/buck converter 15 is coupled to the power supply 11, the supercapacitor 12, the power electronic converter 13, the current sensor 14 and the charging mode controller 16, and is configured to generate the control command CTRL and a current command IMON_OUT according to the first sensed current ISENSE+, the second sensed current ISENSE− and an overall feedback FB_OUT. In detail, the voltage boost/buck converter 15 calculates a charging current of the supercapacitor 12 according to a voltage difference between the first sensed current ISENSE+ and the second sensed current ISENSE− as well as an equivalent resistance of the resistor RS. Then, the voltage boost/buck converter 15 provides the control command CTRL to the power electronic converter 13 for adjusting the output voltage and current according to the charging current of the supercapacitor 12 and the overall feedback FB_OUT, and provides the current command IMON_OUT to the charging mode controller 16 for adjusting the overall feedback FB_OUT.

The charging mode controller 16 is coupled to the power supply 11, the supercapacitor 12 and the voltage boost/buck converter 15, and is configured to provide a current feedback FB1 and a voltage feedback FB2 according to the driving voltage CV, the current command IMON_OUT and a third sensed voltage VSENSE. It is noted that the third sensed voltage VSENSE from the supercapacitor 12 and the current feedback FB1 and the voltage feedback FB2 from the charging mode controller 16 are superposed as the overall feedback FB_OUT, i.e., FB_OUT=VSENSE+FB1+FB2, and then inputted to the same input terminal of the voltage boost/buck converter 15. In one embodiment, the lines for transmitting the third sensed voltage VSENSE, the current feedback FB1 and the voltage feedback FB2 are electrically connected or shorted to the same input terminal of the voltage boost/buck converter 15.

The constant current controller 16A is coupled to the power supply 11 and the voltage boost/buck converter 15, and is configured to generate the current feedback FB1 according to the driving voltage CV and the current command IMON_OUT. The constant voltage controller 16B is coupled to the power supply 11 and the supercapacitor 12, and is configured to generate the voltage feedback FB2 according to the driving voltage CV and the third sensed voltage VSENSE.

Operationally, the third sensed voltage VSENSE is 0 Volts at the beginning of charging, and when the charging mode controller 16 is powered and started, the constant voltage controller 16B generates the voltage feedback FB2 to the voltage boost/buck converter 15 according to the driving voltage CV, such that the voltage boost/buck converter 15 generates the control command CTRL to the power electronic converter 13, so as to start charging the supercapacitor 12. Then, the voltage boost/buck converter 15 generates the current command IMON_OUT to the constant current controller 16A according to the first sensed current ISENSE+, the second sensed current ISENSE− and the overall feedback FB_OUT, such that the constant current controller 16A generates the current feedback FB1 according to the driving voltage CV and the current command IMON_OUT. Meanwhile, the constant voltage controller 16B keeps generating the voltage feedback FB2 according to the driving voltage CV and the third sensed voltage VSENSE.

It is noted that the third sensed voltage VSENSE, the current feedback FB1 and the voltage feedback FB2 are superposed and then inputted to the voltage boost/buck converter 15, and therefore a power storage volume of the supercapacitor 12 observed from the voltage boost/buck converter 15 is higher than the actual power storage volume thereof. Suppose the power storage volume of the supercapacitor 12 is 0 Volts (i.e., the third sensed voltage VSENSE is 0 Volts) at the beginning of charging, then the voltage boost/buck converter 15 will regard the power storage volume the supercapacitor 12 as the voltage feedback FB2 (or a summation of the current feedback FB1 and the voltage feedback FB2), and thus the voltage boost/buck converter 15 controls the power electronic converter 13 to charge the supercapacitor 12 by a lower charging current and voltage. As such, the present disclosure can prevent the supercapacitor 12 from generating a surge or an inrush current at the beginning of charging (the power storage volume is 0 Volts) for protecting internal components of the power system 10.

On the other hand, when the supercapacitor 12 is charged to a predetermined voltage or discharged, the charging mode controller 16 is turned off, and then the voltage boost/buck converter 15 controls the power electronic converter 13 to perform power conversion according to only the third sensed voltage VSENSE (i.e. the actual power storage volume).

In simplicity, the charging mode controller 16 of the present disclosure generates the voltage feedback FB2 to the voltage boost/buck converter 15 at the beginning of charging (at which the power storage volume of the supercapacitor 12 is 0 Volts) for charging the supercapacitor 12 by a lower current; and the charging mode controller 16 is turned off when the supercapacitor 12 is charged to a predetermined voltage or discharged, in order not to affect the operation of the voltage boost/buck converter 15. As such, the charging mode controller 16 of the present disclosure can protect the internal components of the power system 10 from generating a surge of an inrush current at the beginning of charging, without affecting the operation of the power system 10.

Figure 2:
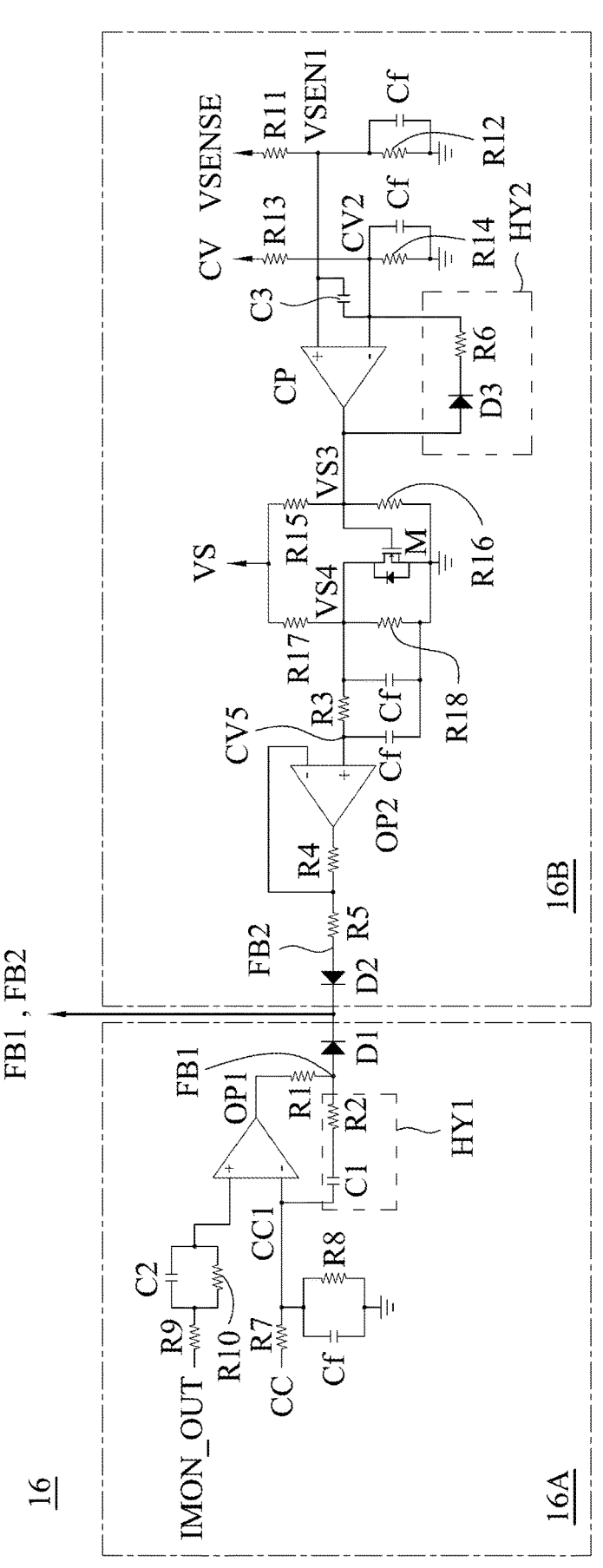
FIG. 2 is a schematic diagram of a charging mode controller in accordance with a first embodiment of the present disclosure.

Referring to FIG. 2, which is a schematic diagram of the charging mode controller 16 in accordance with a first embodiment of the present disclosure. The charging mode controller 16 includes a constant current controller 16A and a constant voltage controller 16B.

Structurally, the constant current controller 16A includes a resistor R1, an operational amplifier OP1, a diode D1, resistors R7, R8, R9, R10 and a capacitor C2. The operational amplifier OP1 includes a positive input terminal for receiving the current command IMON_OUT, includes a negative input terminal for receiving a first predetermined voltage CC1, and includes an output terminal coupled to a first end of the resistor R1. The diode D1 includes an anode coupled to a second end of the resistor R1; and a cathode is coupled to the voltage boost/buck converter 15 and the constant voltage controller 16B, in which the diode D1 is configured to output the current feedback FB1 and block external voltage currents. The resistor R7 includes a first end coupled to a driving voltage CC, and includes a second end coupled to the negative input terminal of the operational amplifier OP1. The resistor R8 includes a first end coupled to the negative input terminal of the operational amplifier OP1, and includes a second end coupled to a ground voltage, in which the first predetermined voltage CC1 is generated from dividing the driving voltage CC by the resistors R7 and R8. The resistor R9 includes a first end coupled to the current command IMON_OUT, and includes a second end coupled to a first end of the resistor R10. The resistor R10 includes a first end coupled to the second end of the resistor R9, and includes a second end coupled to the positive input terminal of the operational amplifier OP1. The capacitor C2 and the resistor R10 are connected in parallel for blocking a direct current of the current command IMON_OUT.

Operationally, at the beginning of charging, when the current command IMON_OUT is greater than the first predetermined voltage CC1, the constant current controller 16A outputs the current feedback FB1, such that the voltage boost/buck converter 15 charges the supercapacitor 12 by a lower current; and until the supercapacitor 12 is charged to a predetermined voltage, when the current command IMON_OUT is less than or equal to the first predetermined voltage CC1, the constant current controller 16A is turned off, in order not to affect the operation of the voltage boost/buck converter 15.

In one embodiment, the constant current controller 16A further includes a hysteresis circuit HY1 which can keep the output voltage stable (i.e., reduce output voltage ripples) even if the output voltage of the operational amplifier OP1 is affected by noise. The hysteresis circuit HY1 includes a capacitor C1 and a resistor R2. The capacitor C1 is coupled between the negative input terminal of the operational amplifier OP1 and the resistor R2. A first end of the resistor R2 is coupled to the capacitor C1, and a second end of the resistor R2 is coupled to the second end of the resistor R1 and the anode of the diode D1.

In one embodiment, those ordinary skilled in the art may select the resistances of the resistors R7 and R8 for adjusting the ratio between the driving voltage CC and the first predetermined voltage CC1 according to application requirements. In one embodiment, those ordinary skilled in the art may select the resistances of the resistors R9, R10 for adjusting a voltage component of the current command IMON_OUT inputted to the operational amplifier OP1. In one embodiment, a filter capacitor Cf may be connected in parallel between the negative input terminal operational amplifier OP1 and the ground voltage for filtering out high-frequency noise in the first predetermined voltage CC1.

Operationally, the constant voltage controller 16B includes a comparator CP, a transistor M, resistors R11, R12, R13, R14, R15, R16 and a capacitor C3. The resistor R11 includes a first end coupled to the third sensed voltage VSENSE. The resistor R12 includes a first end coupled to a second end of the resistor R11, and includes a second end coupled to a ground voltage, in which a fourth sensed voltage VSEN1 is generated from dividing the third sensed voltage VSENSE by the resistors R11 and R12. The resistor R13 includes a first end coupled to the driving voltage CV. The resistor R14 includes a first end coupled to a second end of the resistor R13, and includes a second end coupled to the ground voltage, in which a second predetermined voltage CV2 is generated from dividing the driving voltage CV by the resistors R13 and R14. The capacitor C3 includes a first end coupled to the fourth sensed voltage VSEN1, and includes a second end coupled to the second predetermined voltage CV2. The comparator CP includes a positive input terminal for receiving the fourth sensed voltage VSEN1, includes a negative input terminal for receiving the second predetermined voltage CV2, and includes an output terminal coupled to a third predetermined voltage VS3, the ground voltage and a gate of the transistor M. The transistor M includes the gate for receiving the third predetermined voltage VS3 or the ground voltage, includes a source coupled to the ground voltage; and a drain coupled to a fourth predetermined voltage VS4 and a first end of the resistor R3. The resistor R15 includes a first end coupled to a driving voltage VS. The resistor R16 includes a first end that coupled to a second end of the resistor R15 and the gate of the transistor M, and includes a second end coupled to the ground voltage and the source of the transistor M, in which the third predetermined voltage VS3 is generated from dividing the driving voltage VS by the resistors R15 and R16.

Operationally, at the beginning of charging, when the fourth sensed voltage VSEN1 is less than the second predetermined voltage CV2, the gate of the transistor M receives the ground voltage to turn off the transistor M, such that the charging circuitry 10A enters a first constant power charging mode. Until the supercapacitor 12 is charged to a predetermined voltage, when the fourth sensed voltage VSEN1 is greater than or equal to the second predetermined voltage CV2, the gate of the transistor M receives the third predetermined voltage VS3 to turn on the transistor M, such that the charging circuitry 10A enters a second constant power charging mode.

The constant voltage controller 16B further includes an operational amplifier OP2, a diode D2 and resistors R3, R4, R5, R17 and R18. The resistor R17 includes a first end coupled to the driving voltage VS. The resistor R18 includes a first end coupled to a second end of the resistor R17 and the drain of the transistor M, and includes a second end coupled to the ground voltage, in which a fourth predetermined voltage VS4 is generated from dividing the driving voltage VS by the resistors R17 and R18. The operational amplifier OP2 includes a positive input terminal coupled to a second end of the resistor R3, includes a negative input terminal coupled to a second end of the resistor R4, and includes an output terminal coupled to a first end of the resistor R4. The resistor R4 includes a first end coupled to the output of the operational amplifier OP2, and includes a second end coupled to the negative input terminal of the operational amplifier OP2 and a first end of a resistor R5. The diode D2 includes an anode coupled to a second end of the resistor, and includes a cathode coupled to the voltage boost/buck converter 15 and the constant voltage controller 16B for outputting the voltage feedback FB2 and blocking external voltage currents.

In operation, during the first constant power charging mode, the driving voltage VS is divided by the resistors R17, R18 and limited by the resistor R3 to generate a fifth predetermined voltage CV5, and is inputted to the positive input terminal of the operational amplifier OP2. The operational amplifier OP2 may be used as a voltage follower for gradually the voltages at the output terminal and the negative input terminal thereof to the voltage at the positive input terminal. That is, during the first constant power charging mode, when the transistor M is turned off, the positive input terminal of the operational amplifier OP2 receives the fifth predetermined voltage CV5 to gradually pull up the voltage feedback FB2, such that the voltage boost/buck converter 15 charges the supercapacitor 12 by a first constant power. During the second constant power charging mode, the transistor M is turned on for gradually the positive input terminal of the operational amplifier OP2 from the fifth predetermined voltage CV5 to the ground voltage, such that the voltage boost/buck converter 15 charges the supercapacitor 12 by a second constant power. When the negative input terminal of the operational amplifier OP2 is pulled down to the ground voltage, the constant voltage controller 16B is turned, in order not to affect the operation of the voltage boost/buck converter 15. That is, when the transistor M is turned on, the positive input terminal of the operational amplifier OP2 receives the ground voltage to gradually pull down the voltage feedback FB2 until the charging circuitry 10A is turned off.

In one embodiment, the constant voltage controller 16B further includes a hysteresis circuit HY2 which can keep the output voltage stable (i.e., reduce output voltage ripples) even if the input voltage of the comparator CP is interfered by noise. The hysteresis circuit HY2 includes a resistor R6 and a diode D3. A first end of the resistor R6 is coupled to the negative input terminal of the comparator CP, and includes a second end of the resistor R6 coupled to a cathode of the diode D3. An anode of the diode D3 is coupled to the output terminal of the comparator CP.

In one embodiment, those ordinary skilled in the art may select the resistances of the resistors R13 and R14 for adjusting the driving voltage CV and the second predetermined voltage CV2 according to application requirements. In one embodiment, those ordinary skilled in the art may select the resistances of the resistors R15 and R16 for adjusting the ratio between the driving voltage VS and the third predetermined voltage VS3 according to application requirements. In one embodiment, those ordinary skilled in the art may select the resistances of the resistors R17 and R18 for adjusting the ratio between the driving voltage VS and the fourth predetermined voltage VS4 according to application requirements. In one embodiment, those ordinary skilled in the art may be select the resistances of the resistors R11 and R12 to adjust the ratio between the third sensed voltage VSENSE and the fourth sensed voltage VSEN1 according to application requirements. In one embodiment, the driving voltage CC, VS and CV may be substantially identical, and a single driving voltage may be converted into multiple predetermined voltages by selecting the ratio between the voltage dividing resistors according to various application requirements; In another embodiment, the driving voltages CC, VS and CV may be substantially different, and those ordinary skilled in the art may select the levels of the driving voltage CC, VS and CV according to application requirements. The driving voltage CC corresponds to constant current characteristics, the driving voltage CV corresponds to constant voltage characteristics, and the driving voltage VS corresponds to voltage signal characteristics of the voltage feedback FB2.

In one embodiment, another filtering capacitor Cf may be connected in parallel between the comparator CP and the ground voltage for filtering out high-frequency noise in the fourth sensed voltage VSEN1. In one embodiment, multiple filtering capacitors Cf may be connected in parallel between the positive input terminal of the operational amplifier OP2 and the ground voltage, so as to respectively filter out high-frequency noises in the second predetermined voltage CV2, the fourth predetermined voltage VS4 and the fifth predetermined voltage CV5.

In one embodiment, the transistor M may be an insulated gate bipolar transistor (IGBT), a metal-oxide semiconductor field effect transistor (MOSFET), or another suitable power transistor.

Figure 3:
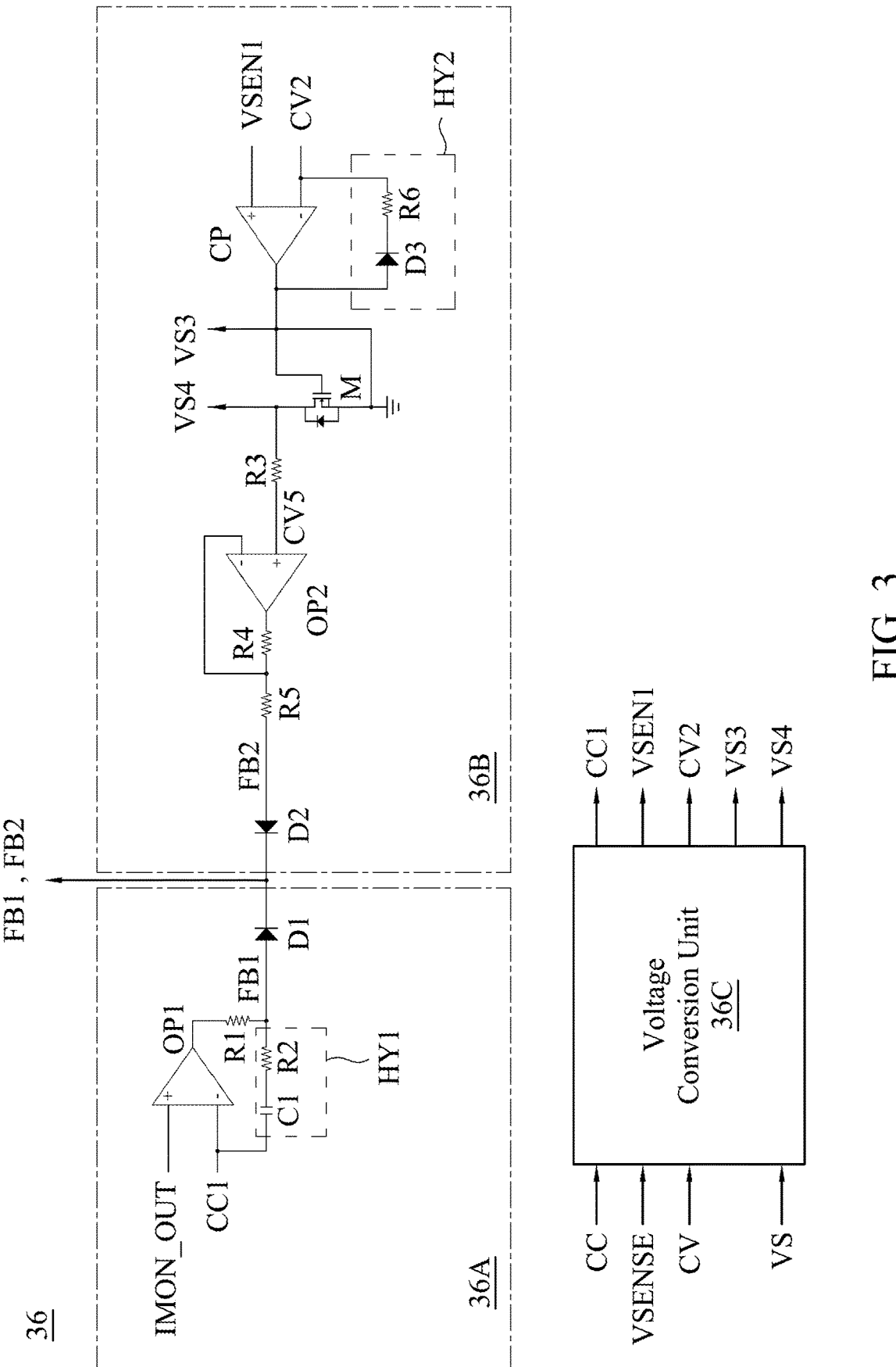
FIG. 3 is a schematic diagram of a charging mode controller in accordance with a second embodiment of the present disclosure.

Referring to FIG. 3, which is a schematic diagram of a charging mode controller 36 in accordance with a second embodiment of the present disclosure. The charging mode controller 36 may be in replace of the charging mode controller 16 in FIGS. 1 and 2, and includes a constant current controller 36A, a constant voltage controller 36B and a voltage conversion unit 36C.

Structurally, the voltage conversion unit 36C is coupled to the power supply 11 and the supercapacitor 12, and is configured to generate the first predetermined voltage CC1 according to the driving voltage CC, generate a fourth sensed voltage VSEN1 according to the third sensed voltage VSENSE, generate the second predetermined voltage CV2 according to the driving voltage CV, and generate the third predetermined voltage VS3 and the fourth predetermined voltage VS4 according to the driving voltage VS. The constant current controller 36A is coupled to the voltage conversion unit 36C and the voltage boost/buck converter 15, and is configured to generate the current feedback FB1 to the voltage boost/buck converter 15 according to the first predetermined voltage CC1 and the current command IMON_OUT. The constant voltage controller 36B is coupled to the voltage conversion unit 36C, the voltage boost/buck converter 15 and the supercapacitor 12, and is configured to generate the voltage feedback FB2 to the voltage boost/buck converter 15 according to the first predetermined voltage CC1 and the fourth sensed voltage VSEN1.

It is noted that the resistors R7~R18, the capacitor C2 and the multiple filtering capacitors Cf in FIG. 2 and other equivalent components may be integrated in the voltage conversion unit 36C, such that the circuit design of the constant current controller 36A and the constant voltage controller 36B in FIG. 3 is simplifier than the circuit design in FIG. 2. In one embodiment, the voltage conversion unit 36C may be integrated in the power supply 11.

The constant current controller 36A includes a resistor R1, an operational amplifier OP1 and a diode D1. The operational amplifier OP1 includes a positive input terminal for receiving the current command IMON_OUT; a negative input terminal for receiving the first predetermined voltage CC1; and an output terminal coupled to a first end of the resistor R1. The diode D1 includes an anode coupled to a second end of the resistor R1; and a cathode coupled to the voltage boost/buck converter 15 and the constant voltage controller 36B for outputting the current feedback FB1 and blocking external voltage currents.

Operationally, the constant current controller 36A outputs the current feedback FB1 when the current command IMON_OUT is greater than the first predetermined voltage CC1, and the constant current controller 36A is turned off when the current command IMON_OUT is less than or equal to the first predetermined voltage CC1.

In one embodiment, the constant current controller 36A further includes a hysteresis circuit HY1, the hysteresis circuit HY1 includes a capacitor C1 and a resistor R2. The capacitor C1 is coupled between the negative input terminal of the operational amplifier OP1 and the resistor R2; a first end of the resistor R2 is coupled to the capacitor C1, and a second end of the resistor R2 is coupled to the second end of the resistor R1 and the anode of the diode D1.

Structurally, the constant voltage controller 36B includes a comparator CP and a transistor M. The comparator CP includes a positive input terminal for receiving the fourth sensed voltage VSEN1; a negative input terminal for receiving the second predetermined voltage CV2; and an output terminal coupled to the second predetermined voltage CV2, a ground voltage and a gate of the transistor M. The transistor M includes a gate for receiving a third predetermined voltage VS3 or the ground voltage; a source coupled to the ground voltage; and a drain coupled to the fourth predetermined voltage VS4 and a first end of the resistor R3. When the fourth sensed voltage VSEN1 is less than the second predetermined voltage CV2, the gate of the transistor M receives the ground voltage to turn off the transistor M, such that the charging circuitry 10A enters a first constant power charging mode. When the fourth sensed voltage VSEN1 is greater than or equal to the second predetermined voltage CV2, the gate of the transistor M receives the third predetermined voltage VS3 to turn on the transistor M, such that the charging circuitry 10A enters a second constant power charging mode.

The constant voltage controller 36B includes an operational amplifier OP2, a diode D2 and resistors R3, R4, R5. The operational amplifier OP2 includes a positive input terminal coupled to a second end of the resistor, and includes a negative input terminal for receiving the fifth predetermined voltage CV5, and includes an output terminal coupled to a first end of the resistor R4, in which the fifth predetermined voltage CV5 is generated from limiting the fourth predetermined voltage VS4 by the resistor R3. The resistor R4 includes a first end coupled to the output terminal of the operational amplifier OP2, and includes a second end coupled to the negative input terminal of the operational amplifier OP2 and a first end of the resistor R5. The diode D2 includes an anode coupled to a second end of the resistor R5, and includes a cathode coupled to the voltage boost/buck converter 15 and the constant voltage controller 36B for outputting the voltage feedback FB2 and blocking external voltage currents.

Operationally, during the first constant power charging mode, the transistor M is turned off, and the constant voltage controller 36B gradually pulls up the voltage feedback FB2 according to the fifth predetermined voltage CV5, such that the voltage boost/buck converter 15 charges the supercapacitor 12 by a first constant power. During the second constant power charging mode, the transistor M is turned on for gradually pulling down the positive input terminal of the operational amplifier OP2 from the fifth predetermined voltage CV5 to the ground voltage, such that the voltage boost/buck converter 15 charges the supercapacitor 12 by a second constant power. When the negative input terminal of the operational amplifier OP2 is pulled down to the ground voltage, the constant voltage controller 36B is turned off, in order not to affect the operation of the voltage boost/buck converter 15. That is, when the transistor M is turned on, the positive input terminal of the operational amplifier OP2 receives the ground voltage for gradually pulling down the voltage feedback FB2 until the charging circuitry 10A.

In one embodiment, the constant voltage controller 36B further includes a hysteresis circuit HY2, and the hysteresis circuit HY2 includes a resistor R6 and a diode D3. A first end of the resistor R6 is coupled to the negative input terminal of the comparator CP, and a second end of the resistor R6 is coupled to a cathode of a diode D3; an anode of the diode D3 is coupled to an output of the comparator CP.

Figure 4:
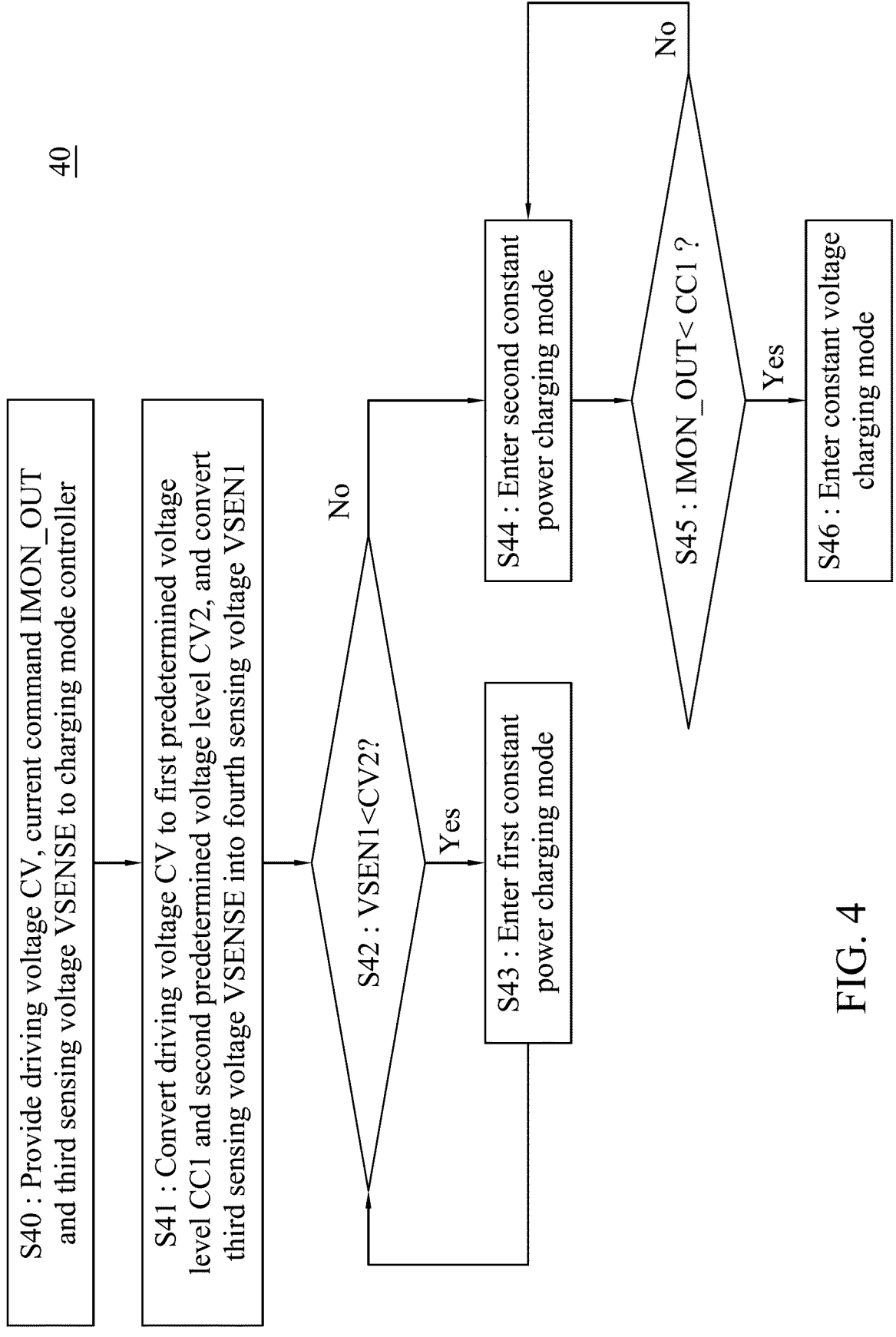
FIG. 4 is a flowchart of a supercapacitor charging method in accordance with some embodiments of the present disclosure.

FIG. 4 is a flowchart of a charging method 40 for a supercapacitor in accordance with some embodiments of the present disclosure. The charging method 40 may be executed by the charging circuitry 10A, and includes the following steps.

Step S40: provide the driving voltage CV, the current command IMON_OUT and the third sensed voltage VSENSE to the charging mode controller 16 (or the charging mode controller 36).

Step S41: convert the driving voltage CV into the first predetermined voltage CC1 and the second predetermined voltage CV2, and convert the third sensed voltage VSENSE into the fourth sensed voltage VSEN1.

Step S42: determine whether the fourth sensed voltage VSEN1 is less than the second predetermined voltage CV2. If yes, then Step S43 is performed; otherwise, Step S44 is performed.

Step S43: enter the first constant power charging mode and then return to Step S42.

Step S44: enter the second constant power charging mode.

Step S45: determine whether the current command IMON_OUT is less than the first predetermined voltage CC1. If yes, then Step S46 is performed; otherwise, Step S44 is performed.

Step S46: enter the constant voltage charging mode.

In Step S43, the charging mode controller 16 (or the charging mode controller 36) provides the current feedback FB1 and the voltage feedback FB2 at the same time, and the third sensed voltage VSENSE from the supercapacitor 12 and the current feedback FB1 and the voltage feedback FB2 from the charging mode controller 16 (or the charging mode controller 36) are superposed and then inputted to the same input terminal of the voltage boost/buck converter 15 to enter the first constant power charging mode. In Step S44, the charging mode controller 16 (or the charging mode controller 36) only provides the voltage feedback FB2, and the third sensed voltage VSENSE from the supercapacitor 12 and the voltage feedback FB2 from the charging mode controller 16 (or the charging mode controller 36) are superposed and then inputted to the same input terminal of the voltage boost/buck converter 15 to enter the second constant power charging mode. The details of the charging method 40 can be referred to the related descriptions of FIGS. 2 and 3, and thus the description thereof is not repeated herein.

Figure 5:
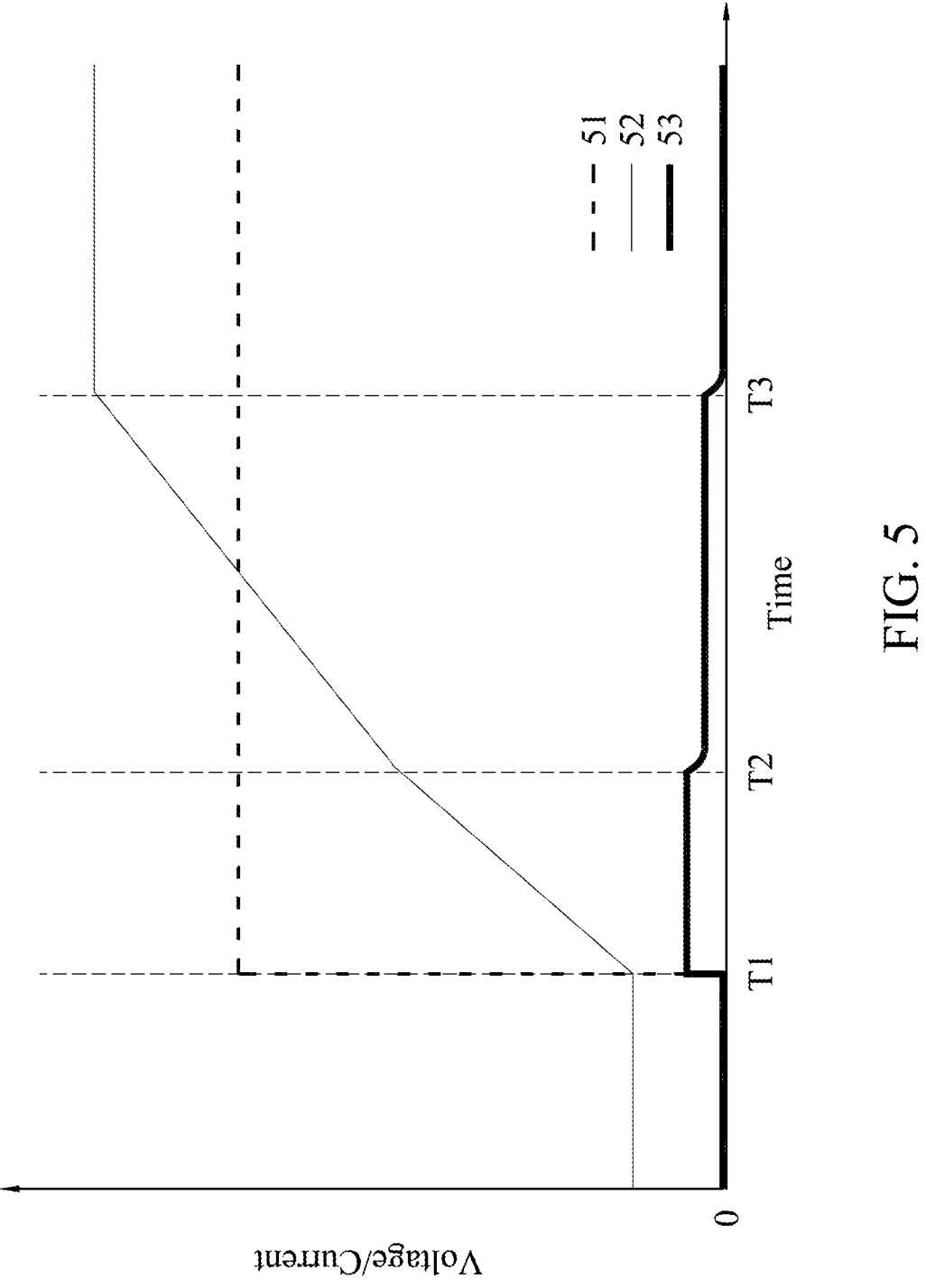
FIG. 5 is a signal waveform of the supercapacitor during charging in accordance with some embodiments of the present disclosure.

FIG. 5 shows a signal waveform of the power system 10 in FIG. 1 during a charging period of the supercapacitor 12, in which the curve 51 represents the output voltage of the power electronic converter 13, the curve 52 represents the third sensed voltage VSENSE (i.e., the power storage volume of the supercapacitor 12), and the curve 53 represents the output current of the power electronic converter 13. As shown in FIG. 5, the charging circuitry 10A enters a first constant power charging mode between the times T1 and T2, in which the charging current and voltage of the supercapacitor 12 is approximately fixed, the third sensed voltage VSENSE rises approximately in a first rate. The charging circuitry 10A enters a second constant power charging mode between the times T2 and T3, in which the third sensed voltage VSENSE rises approximately in a second rate higher than the first rate. After the time T3, the charging mode controller 16 (or the charging mode controller 36) is turned off and the charging circuitry 10A enters a constant voltage charging mode until the supercapacitor 12 is fully charged.

In summary, the charging mode controller according to the present disclosure generates an overall feedback to the voltage boost/buck controller at the beginning of charging (at which the power storage volume of the supercapacitor is 0 Volts), for charging the supercapacitor by a lower current; moreover, the charging mode controller is turned off when the supercapacitor is charged to a predetermined voltage or discharged, in order not to affect the operation of the voltage boost/buck controller. Embodiments of the present disclosure have at least the following advantages: (1) the charging mode controller according to the embodiments of the present disclosure can protect internal components of the power system from generating a surge or an inrush current at the beginning of charging; (2) different from conventional voltage boost/buck controller that controls charging according to only the power storage volume of the supercapacitor, the overall feedback according to the present disclosure includes signal components of current and voltage feedbacks, which can increase control accuracy; and (3) the current sensor is arranged after the energy storage inductor of the power electronic converter, which can avoid detecting the noise from the input terminal of the power supply.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A charging circuitry for charging or discharging a supercapacitor, the charging circuitry comprising:
   a power electronic converter configured to charge or discharge the supercapacitor according to a control command;
   a current sensor coupled to the supercapacitor, and configured to detect a first sensed voltage and a second sensed voltage;
   a voltage boost/buck controller coupled to the supercapacitor, the power electronic converter and the current sensor, and configured to generate the control command and a current command according to the first sensed voltage, the second sensed voltage and an overall feedback; and
   a charging mode controller coupled to the supercapacitor and the voltage boost/buck controller, and configured to generate a current feedback and a voltage feedback to the voltage boost/buck controller according to a driving voltage, the current command and a third sensed voltage of the supercapacitor;
   wherein the third sensed voltage, the current feedback and the voltage feedback are superposed as the overall feedback and then inputted to a same input terminal of the voltage boost/buck controller.

2. The charging circuitry of claim 1, wherein the charging mode controller comprises:

a voltage conversion unit coupled to a power supply and the supercapacitor, configured to generate a first predetermined voltage, a second predetermined voltage, a third predetermined voltage and a fourth predetermined voltage according to the driving voltage, and configured to generate a fourth sensed voltage according to the third sensed voltage;
   a constant current controller coupled to the voltage conversion unit and the voltage boost/buck controller, and configured to generate the current feedback to the voltage boost/buck controller according to the first predetermined voltage and the current command; and
   a constant voltage controller coupled to the voltage conversion unit, the voltage boost/buck controller and the supercapacitor, and configured to generate the voltage feedback to the voltage boost/buck controller according to the second predetermined voltage, the third predetermined voltage, the fourth predetermined voltage and the fourth sensed voltage.

3. The charging circuitry of claim 2, wherein the constant current controller comprises:
   a first resistor;
   a first operational amplifier, comprising:
      a positive input terminal configured to receive the current command;
      a negative input terminal configured to receive the first predetermined voltage; and
      an output terminal coupled to a first end of the first resistor; and
   a first diode, comprising:
      an anode coupled to a second end of the first resistor; and
      a cathode coupled to the voltage boost/buck controller and the constant voltage controller, and configured to output the current feedback;
   wherein the constant current controller outputs the current feedback when the current command is greater than the first predetermined voltage, and wherein the constant current controller is turned off when the current command is less than or equal to the first predetermined voltage.

4. The charging circuitry of claim 3, wherein the constant current controller further comprises a first hysteresis circuit, and the first hysteresis circuit comprises a first capacitor and a second resistor, and wherein:
   the first capacitor is coupled between the negative input terminal of the first operational amplifier and the second resistor;
   a first end of the second resistor is coupled to the first capacitor, and a second end of the second resistor is coupled to the second end of the first resistor and the anode of the first diode.

5. The charging circuitry of claim 2, wherein the constant voltage controller comprises:
   a comparator, comprising:
      a positive input terminal configured to receive the fourth sensed voltage;
      a negative input terminal configured to receive the second predetermined voltage; and
      an output terminal coupled to the first predetermined voltage, a ground voltage and a gate of a transistor; and
   the transistor, comprising:
      the gate configured to receive the third predetermined voltage or the ground voltage;
      a source coupled to the ground voltage; and a drain coupled to the fourth predetermined voltage and a first end of a third resistor;

wherein the gate of the transistor receive the ground voltage to turn off the transistor when the fourth sensed voltage is less than the second predetermined voltage, such that the charging circuitry enters a first constant power charging mode;

wherein the gate of the transistor receives the third predetermined voltage to turn on the transistor when the fourth sensed voltage is greater than or equal to the second predetermined voltage, such that the charging circuitry enters a second constant power charging mode.

6. The charging circuitry of claim 5, wherein the constant voltage controller comprises:

the third resistor;

a second operational amplifier, comprising:
   a positive input terminal coupled to a second end of the third resistor;
   a negative input terminal configured to receive a fifth predetermined voltage, wherein the fifth predetermined voltage is generated from limiting the fourth predetermined voltage by the third resistor; and
   an output terminal;

a fourth resistor, comprising:
   a first end coupled to the output terminal of the second operational amplifier; and
   a second end coupled to the negative input terminal of the second operational amplifier and a first end of a fifth resistor;

the fifth resistor;

a second diode, comprising:
   an anode coupled to a second end of the fifth resistor; and
   a cathode coupled to the voltage boost/buck controller and the constant voltage controller, and configured to output the voltage feedback;

wherein, when the transistor is turned off, the positive input terminal of the second operational amplifier receives the fifth predetermined voltage, so as to gradually pull up the voltage feedback; when the transistor is turned on, the positive input terminal of the second operational amplifier receives the ground voltage, so as to gradually pull down the voltage feedback until the charging circuitry is turned off.

7. The charging circuitry of claim 6, wherein the constant voltage controller further comprises a second hysteresis circuit, the second hysteresis circuit comprises a sixth resistor and a third diode, wherein:

a first end of the sixth resistor is coupled to the negative input terminal of the comparator, and a second end of the sixth resistor is coupled to a cathode of the third diode;

an anode of the third diode is coupled to the output terminal of the comparator.

8. The charging circuitry of claim 1, wherein the charging mode controller comprises:

a constant current controller coupled to a power supply and the voltage boost/buck controller, and configured to generate the current feedback to the voltage boost/buck controller according to a first predetermined voltage and the current command; and a constant voltage controller coupled to the power supply, the voltage boost/buck controller and the supercapacitor, and configured to generate the voltage feedback to the voltage boost/buck controller according to a second predetermined voltage, a third predetermined voltage, a fourth predetermined voltage and the third sensed voltage.

9. The charging circuitry of claim 8, wherein the constant current controller comprises:

a first resistor;

a first operational amplifier, comprising:
   a positive input terminal configured to receive the current command;
   a negative input terminal configured to receive the first predetermined voltage; and
   an output terminal coupled to a first end of the first resistor;

a first diode, comprising:
   an anode coupled to a second end of the first resistor; and
   a cathode coupled to the voltage boost/buck controller and the constant voltage controller, and configured to output the current feedback;

a seventh resistor, comprising:
   a first end coupled to the driving voltage; and
   a second end coupled to the negative input terminal of the first operational amplifier;

an eighth resistor, comprising:
   a first end coupled to the negative input terminal of the first operational amplifier; and
   a second end coupled to a ground voltage, wherein the first predetermined voltage is generated from dividing the driving voltage by the seventh resistor and the eighth resistor;

a ninth resistor, comprising:
   a first end coupled to the current command; and
   a second end coupled to a first end of a tenth resistor;

the tenth resistor, comprising:
   a first end coupled to the second end of the ninth resistor; and
   a second end coupled to the positive input terminal of the first operational amplifier; and a second capacitor connected in parallel with the tenth resistor for blocking a direct current of the current command;

wherein the constant current controller outputs the current feedback when the current command is greater than the first predetermined voltage, and wherein the constant current controller is turned off when the current command is less than or equal to the first predetermined voltage.

10. The charging circuitry of claim 9, wherein the constant current controller further a first hysteresis circuit, and the first hysteresis circuit comprises a first capacitor and a second resistor, and wherein:

the first capacitor is coupled between the negative input terminal of the first operational amplifier and the second resistor;

a first end of the second resistor is coupled to the first capacitor, and a second end of the second resistor is coupled to the second end of the first resistor and the anode of the first diode.

11. The charging circuitry of claim 8, wherein the constant voltage controller comprises:

an eleventh resistor comprising a first end coupled to the third sensed voltage;

a twelfth resistor, comprising:
   a first end coupled to a second end of the eleventh resistor; and a second end coupled to a ground voltage, wherein a fourth sensed voltage is generated from dividing by the eleventh resistor and the twelfth resistor;

a thirteenth resistor comprising a first end coupled to the driving voltage;

a fourteenth resistor, comprising:

a first end coupled to a second end of the thirteenth resistor; and a second end coupled to the ground voltage, wherein the second predetermined voltage is generated from dividing by the thirteenth resistor and the fourteenth resistor;

a third capacitor, comprising:

a first end coupled to the fourth sensed voltage; and a second end coupled to the first predetermined voltage;

a comparator, comprising:

a positive input terminal configured to receive the fourth sensed voltage;

a negative input terminal configured to receive the second predetermined voltage; and an output terminal coupled to the third predetermined voltage, a ground voltage and a gate of a transistor;

the transistor, comprising:

the gate configured to receive the third predetermined voltage or the ground voltage;

a source coupled to the ground voltage; and a drain coupled to the first predetermined voltage and a first end of a third resistor;

a fifteenth resistor comprising a first end coupled to the driving voltage;

a sixteenth resistor, comprising:

a first end coupled to a second end of the fifteenth resistor and the gate of the transistor; and a second end coupled to the ground voltage and the source of the transistor;

wherein the gate of the transistor receives the ground voltage to turn off the transistor the fourth sensed voltage is less than the second predetermined voltage, such that the charging circuitry enters a first constant power charging mode;

wherein the gate of the transistor receives the third predetermined voltage to turn on the transistor when the fourth sensed voltage is greater than or equal to the second predetermined voltage, such that the charging circuitry enters a second constant power charging mode.

12. The charging circuitry of claim 11, wherein the constant voltage controller further comprises:

a seventeenth resistor comprising a first end coupled to the driving voltage;

an eighteenth resistor, comprising:

a first end coupled to a second end of the seventeenth resistor and the drain of the transistor; and a second end coupled to the ground voltage;

the third resistor;

a second operational amplifier, comprising:

a positive input terminal coupled to a second end of the third resistor;

a negative input terminal configured to receive a fifth predetermined voltage, wherein the fifth predetermined voltage is generated form dividing the driving voltage by the seventeenth resistor and the eighteen resistor and limiting by the third resistor; and an output terminal;

a fourth resistor, comprising:

a first end coupled to the output terminal of the second operational amplifier; and a second end coupled to the negative input terminal of the second operational amplifier and a first end of a fifth resistor;

the fifth resistor;

a second diode, comprising:

an anode coupled to a second end of the fifth resistor; and a cathode coupled to the voltage boost/buck controller and the constant voltage controller, and configured to output the voltage feedback;

wherein the positive input terminal of the second operational amplifier receives the fifth predetermined voltage when the transistor is turned off, so as to gradually pull up the voltage feedback; and wherein the positive input terminal of the second operational amplifier receives the ground voltage when the transistor is turned on, so as to gradually pull down the voltage feedback until the charging circuitry is turned off.

13. The charging circuitry of claim 12, wherein the constant voltage controller further comprises a second hysteresis circuit, and the second hysteresis circuit comprises a sixth resistor and a third diode, wherein:

a first end of the sixth resistor is coupled to the negative input terminal of the comparator, and a second end of the sixth resistor is coupled to a cathode of the third diode;

an anode of the third diode is coupled to the output of the comparator.

14. The charging circuitry of claim 1, wherein:

a first end of the current sensor is coupled to the power electronic converter for detecting the first sensed voltage, and a second end of the current sensor is coupled to the supercapacitor for detecting the second sensed voltage;

the voltage boost/buck controller is further configured to calculate a charging current of the supercapacitor according to the first sensed voltage, the second sensed voltage and an equivalent resistance of the current sensor.

15. A power system, comprising:

the charging circuitry as recited in claim 1;

a supercapacitor; and a power supply coupled to the charging circuitry, and configured to:

provide charging power and a driving voltage to the charging circuitry during charging, such that the charging circuitry charges the supercapacitor according to the charging power and the driving voltage; and storing the power from the supercapacitor during discharging.

16. A charging method for the charging circuitry in claim 1, comprising:

generating a current command according to a first sensed voltage, a second sensed voltage and an overall feedback;

providing a driving voltage, the current command and a third sensed voltage to a charging mode controller;

converting the driving voltage into a first predetermined voltage and a second predetermined voltage, and converting the third sensed voltage into a fourth sensed voltage;

entering a first constant power charging mode for a supercapacitor when the fourth sensed voltage is less than the second predetermined voltage;

entering a second d constant power charging mode for the supercapacitor when the fourth sensed voltage is greater than or equal to the second predetermined voltage; and entering a constant voltage charging mode for the supercapacitor when the current command is less than the first predetermined voltage;

wherein the third sensed voltage of the supercapacitor and a current feedback and a voltage feedback generated by the charging mode controller are superposed as the overall feedback and then inputted to a same input terminal of a voltage boost/buck converter.

\* \* \* \* \*